US012515590B2

(12) United States Patent
Binder (10) Patent No.: US 12,515,590 B2
(45) Date of Patent: Jan. 6, 2026

(54) METHOD FOR DISPLAYING A SURROUNDINGS MODEL OF A VEHICLE, COMPUTER PROGRAM, ELECTRONIC CONTROL UNIT AND VEHICLE

(71) Applicant: Robert Bosch GmbH, Stuttgart (DE)

(72) Inventor: Andreas Binder, Erkenbrechtsweiler (DE)

(73) Assignee: ROBERT BOSCH GMBH, Stuttgart (DE)

( * ) Notice: Subject to any disclaimer, the term of this patent is extended or adjusted under 35 U.S.C. 154(b) by 69 days.

(21) Appl. No.: 17/777,699

(22) PCT Filed: Nov. 18, 2020

(86) PCT No.: PCT/EP2020/082482
§ 371 (c)(1),
(2) Date: May 18, 2022

(87) PCT Pub. No.: WO2021/110412
PCT Pub. Date: Jun. 10, 2021

(65) Prior Publication Data
US 2023/0025209 A1    Jan. 26, 2023

(30) Foreign Application Priority Data

Dec. 5, 2019    (DE) .................. 10 2019 219 017.0

(51) Int. Cl.
*B60R 1/27*    (2022.01)
*G06T 7/60*    (2017.01)
(Continued)

(52) U.S. Cl.
CPC ............... *B60R 1/27* (2022.01); *G06T 7/60* (2013.01); *G06T 7/70* (2017.01); *G06T 15/04* (2013.01);
(Continued)

(58) Field of Classification Search
None
See application file for complete search history.

(56) References Cited

U.S. PATENT DOCUMENTS 10,694,105 B1 * 6/2020 Yadav .................. G06T 7/248
2007/0263902 A1 * 11/2007 Higuchi .............. G05D 1/0246
382/104
(Continued)

FOREIGN PATENT DOCUMENTS

CN            110248845 A        9/2019
DE        102008034594 A1        1/2010
(Continued)

OTHER PUBLICATIONS

International Search Report for PCT/EP2020/082482, Issued Feb. 8, 2021.

*Primary Examiner* — Anh-Tuan V Nguyen
(74) *Attorney, Agent, or Firm* — NORTON ROSE FULBRIGHT US LLP (57) ABSTRACT

A method for displaying a surroundings model of a vehicle. The method includes: capturing at least one sequence of camera images of at least one section of the surroundings of the vehicle with the aid of at least one camera; detecting a position of the vehicle; storing at least one camera image of the surroundings of the vehicle, each stored camera image being assigned the detected position of the vehicle) at the moment the stored camera image was captured; determining distances between the vehicle and objects in the surroundings; generating at least one close-range projection surface which represents the close range around the vehicle, the close-range projection surface being deformed three-dimensionally depending on the determined distances; and displaying the surroundings model as a function of the generated close-range projection surface, at least one current (Continued)

camera image, a stored camera image and the present vehicle position.

14 Claims, 3 Drawing Sheets

(51) Int. Cl.
    *G06T 7/70*         (2017.01)
    *G06T 15/04*       (2011.01)
    *G06T 15/20*       (2011.01)
    *G06V 20/58*       (2022.01)
    *G06V 20/64*       (2022.01)
    *G08G 1/16*        (2006.01)

(52) U.S. Cl.
    CPC ............ *G06T 15/205* (2013.01); *G06V 20/58* (2022.01); *G06V 20/64* (2022.01); *G08G 1/161* (2013.01); *G06T 2207/30261* (2013.01)

(56) References Cited

U.S. PATENT DOCUMENTS

| | | | | |
|---|---|---|---|---|
| 2010/0121561 A1* | 5/2010 | Kodaira | ............... | G06V 20/588 382/104 |
| 2010/0259372 A1* | 10/2010 | Hideshiro | ............... | H04N 7/181 340/435 |
| 2013/0033602 A1* | 2/2013 | Quast | ............... | B60R 1/27 348/148 |
| 2014/0068439 A1* | 3/2014 | Lacaze | ............... | G06F 3/04855 715/720 |
| 2014/0118341 A1 | 5/2014 | Shimizu | | |
| 2014/0267282 A1* | 9/2014 | Ren | ............... | G01C 21/367 345/428 |
| 2014/0278065 A1* | 9/2014 | Ren | ............... | G06T 17/05 701/454 |
| 2014/0292805 A1* | 10/2014 | Yamada | ............... | G09G 5/00 345/629 |
| 2014/0300743 A1* | 10/2014 | Kumon | ............... | G08G 1/166 348/148 |
| 2015/0084755 A1* | 3/2015 | Chen | ............... | G08G 1/16 340/435 |
| 2015/0178884 A1* | 6/2015 | Scholl | ............... | G06T 7/33 382/104 |
| 2015/0179066 A1* | 6/2015 | Rider | ............... | G08G 1/04 701/31.5 |
| 2016/0037154 A1* | 2/2016 | Hung | ............... | G06T 7/593 348/47 |
| 2017/0088048 A1* | 3/2017 | Iwamoto | ............... | B60Q 9/00 |
| 2018/0089899 A1* | 3/2018 | Piemonte | ............... | G01C 21/26 |
| 2018/0293769 A1* | 10/2018 | Rusu | ............... | G06T 3/60 |
| 2018/0309962 A1* | 10/2018 | Shimizu | ............... | H04N 5/272 |
| 2019/0050959 A1* | 2/2019 | Husted | ............... | B60R 1/27 |
| 2019/0139298 A1* | 5/2019 | Cho | ............... | B60K 35/23 |
| 2019/0206124 A1* | 7/2019 | Zhou | ............... | G06V 20/56 |
| 2019/0339701 A1* | 11/2019 | Pedersen | ............... | G05D 1/0044 |
| 2019/0356850 A1* | 11/2019 | Ashrafi | ............... | H04N 23/667 |
| 2020/0267492 A1* | 8/2020 | Laaksonen | ............... | A63F 13/525 |
| 2020/0284913 A1* | 9/2020 | Amelot | ............... | G01S 7/4808 |
| 2020/0349367 A1* | 11/2020 | Sasaki | ............... | G06T 7/251 |
| 2023/0049561 A1* | 2/2023 | Sun | ............... | G06V 20/58 |

FOREIGN PATENT DOCUMENTS

| | | |
|---|---|---|
| DE | 102010010906 A1 | 1/2011 |
| DE | 102012018325 A1 | 3/2014 |
| DE | 102014208310 A1 | 11/2015 |
| EP | 1462762 A1 | 9/2004 |
| EP | 2234399 A1 | 9/2010 |
| EP | 2511137 A1 | 10/2012 |
| EP | 3358840 A1 | 8/2018 |
| WO | 2012144053 A1 | 10/2012 |

\* cited by examiner

METHOD FOR DISPLAYING A SURROUNDINGS MODEL OF A VEHICLE, COMPUTER PROGRAM, ELECTRONIC CONTROL UNIT AND VEHICLE

FIELD

The present invention relates to a method for displaying a surroundings model of a vehicle. In addition, the present invention relates to a computer program as well as an electronic control unit, each of which is equipped to carry out the method of the present invention. The present invention also relates to a vehicle having the electronic control unit according to the present invention.

BACKGROUND INFORMATION

German Patent Application No. DE 10 2008 034 594 A1 describes a method for displaying an area surrounding a vehicle, in which at least two images are projected onto a perspectively-reproduced virtual roadway plane. In addition, with the aid of synthesis, the image displayed may be made up of the image of a camera and of a device for sensing the surroundings. For example, the roadway profile and/or the height of an object on the roadway may be detected, and this may be represented by a curvature of corresponding image regions. For instance, a curb is sensed by the device for sensing the surroundings, and the virtual roadway surface is deformed at the corresponding location.

European Patent No. EP 2 511 137 A1 describes a display of a surroundings model of a vehicle.

An object of the present invention is to improve the conventional displays of a surroundings model of a vehicle.

SUMMARY

The aforesaid objective may be achieved with example embodiments of the present invention.

The present invention relates to a method for displaying a surroundings model of a vehicle. In accordance with an example embodiment of the present invention, in the method, in one step, at least one sequence of camera images of at least one section of the area surrounding the vehicle is captured with the aid of at least one camera. In particular, the sequence of camera images is captured continuously. The camera is mounted on the vehicle, the camera preferably having a wide-angle optical system. At least four cameras are mounted advantageously on the vehicle, a first camera having a first direction of view forward, a second camera having a second direction of view rearward, a third camera having a third direction of view to the right and a fourth camera having a fourth direction of view to the left, each capturing different sections of the vehicle surroundings. The sections captured may overlap to some extent. In other words, the surroundings all around the vehicle are captured advantageously with the aid of at least four cameras on the vehicle, the cameras having directions of view differing from one another. In a further method step, a position of the vehicle is detected. In particular, the vehicle position is detected continuously, so that the present position of the vehicle and previous positions of the vehicle are known. The position is detected utilizing at least one position sensor, preferably utilizing a position sensor for a global navigation satellite system. As an option, the position may also be detected depending on measured distances from objects in the surroundings and/or depending on map data and/or depending on odometry data of the vehicle. At least one captured camera image of the vehicle surroundings is then stored in an electronic memory, especially at least for a predetermined period of time. Each of these stored camera images is assigned the detected position of the vehicle at the moment the stored camera image was captured. In a further step, distances between the vehicle and objects in the area surrounding the vehicle are determined. Advantageously, the distances are determined three-dimensionally, e.g., by the use of at least one ultrasonic sensor, a stereo camera, a radar sensor and/or a lidar sensor and/or based on a structure-from-motion analysis with the aid of at least one camera. After that, at least one close-range projection surface of the surroundings model is generated, in so doing, at least one section of the close-range projection surface being deformed spatially, that is, three-dimensionally as a function of the determined distances. Optionally, the close-range projection surface may be expanded advantageously by a far-range projection surface, the far-range projection surface not being deformed as a function of determined distances, and the close-range projection surface and the far-range projection surface being disposed seamlessly, that is, directly next to one another, for example, or apart from one another. The three-dimensional deformation of the close-range projection surface as a function of the determined distances is carried out advantageously starting from an at least partially planar grid as close-range projection surface. In this context, the grid may include any mesh shapes as desired, for example, the grid has triangular or quadrangular meshes. The close-range projection surface is curved as a function of the determined distances, for instance, and/or as a function of objects recognized in the camera image, so that the close-range projection surface advantageously represents an enveloping surface around the background and the objects in the vicinity of the vehicle. As mentioned above, this close-range projection surface or enveloping surface is preferably a grid. Finally, the surroundings model is displayed or represented as a function of the generated close-range projection surface, at least one current camera image and a stored camera image as well as the present vehicle position. In this display or representation, preferably the current camera image as a function of the present vehicle position, and the stored camera image as a function of the present position and the assigned position of the vehicle at the capture moment are projected as textures onto the generated close-range projection surface and/or a far-range projection surface. In this display, multiple current camera images from multiple cameras as well as multiple stored camera images are projected advantageously onto the close-range projection surface and/or the far-range rejection surface. In this context, preferably a current and/or stored camera image is/are projected onto the close-range projection surface and/or the far-range projection surface for each grid mesh separately, that is, for sections of the respective image, in doing so, an image-coordinate transformation of a section of the captured camera image advantageously being carried out per assigned mesh depending on the mesh shape and the detected distances of the respective associated grid points from the vehicle. The method yields the advantage that areas of the surroundings model which presently can no longer be seen with the aid of a camera on the vehicle because they are hidden at least briefly by another object such as a passing vehicle, for example, are also displayed in the surroundings model with a realistic or stored texture for the user. The method has the advantage that during a parking maneuver, a more complete and realistic view of the surroundings results for the user.

Advantageously, in accordance with an example embodiment of the present invention, the texture areas of the surroundings model, which are characterized based on stored camera images, that is, on camera images that are not current, may be displayed so that they are falsified in terms of color, for example, or in shades of gray instead of in color. In this way, at any time, the user is able to recognize which areas of the surroundings model displayed are being captured presently and which areas of the surroundings model displayed are based on stored camera images.

In accordance with an example embodiment of the present invention, it is provided advantageously to place at least one far-range projection surface relative to the close-range projection surface, in particular, the far-range projection surface at least partially defining an edge of the surroundings model. For instance, the far-range projection surface is an inner surface of a cylinder envelope disposed essentially perpendicular to the close-range projection surface. Preferably, camera images with remote views of the surroundings are represented as texture on the far-range projection surface. In other words, a close range of the area surrounding the vehicle is advantageously represented as texture on a three-dimensionally deformed close-range projection surface, particularly as an enveloping surface, and a far range of the surroundings is represented on at least one far-range projection surface, the far-range projection surface preferably being disposed essentially perpendicular to the close-range projection surface and not being deformed three-dimensionally. As an option, the close-range projection surface and the at least one far-range projection surface may contact each other at the boundaries, giving the impression of one continuous projection surface. Thanks to this further development, a realistic view of the surroundings may be produced as surroundings model with relatively little computing power.

In one preferred specific example embodiment of the present invention, it may be provided to store the camera image or camera images only within a predetermined period of time starting from the present moment. In other words, in this specific embodiment, older camera images are discarded, that is, are erased from the electronic memory or overwritten in the electronic memory. Alternatively or additionally, the camera images may also be stored depending on a predetermined time interval and/or depending on a predetermined distance between positions of the vehicle. Put another way, in each case a new camera image is stored every 5 seconds as predetermined time interval, for example, and/or after a distance traveled by the vehicle of, e.g., 2 m as predetermined distance between positions. This yields the advantage that the storage space for storing the camera images is circumscribed and the surroundings model is able to be displayed with little computing power.

In a further refinement of the present invention, in addition, each stored camera image is assigned a viewing angle of the respective camera at the moment the image was captured. Moreover, in the surroundings model displayed, the stored camera image is projected as texture onto the generated close-range projection surface and/or onto the far-range projection surface depending on the assigned viewing angle. This refinement of the present invention results in a less computing-intensive representation of the surroundings model.

In one example embodiment of the present invention, prior to displaying the surroundings model, at least one object in the area surrounding the vehicle is recognized depending on the camera image captured. In addition, an object mobility is advantageously detected. In the optional detection of the object mobility, it is determined, for example, whether the object is principally movable or is basically static. A height and/or a width of the recognized object is then ascertained. In this embodiment, in generating the close-range projection surface, it is additionally deformed three-dimensionally depending on the ascertained height and/or the ascertained width of the recognized object. This refinement results in a surroundings model that is realistic for the user. Optionally, the close-range projection surface is also adjusted or deformed or generated depending on the detected object mobility. To improve the perceptibility of moving objects, it may be provided to display moving objects depending on the detected object mobility so that they are easily discernible in the surroundings model, e.g., by an increased height in comparison to the detected height and/or a widening in comparison to the detected width of the object and/or by identifying the object in terms of color. For example, moving objects may be displayed with double the height and/or with double the width on the close-range projection surface. In this way, the moving objects become particularly easily discernible.

In one further development of the present invention, at least one object in the area surrounding the vehicle is also recognized depending on the captured camera image. A standard model for the recognized object is then loaded from a database, the database specifically containing a large number of stored objects. In this further development, the spatial deformation in generating the close-range projection surface is additionally carried out depending on the loaded standard model. Put another way, recognized objects such as parked vehicles and/or houses are loaded as stored standard models from a database, and the close-range projection surface is deformed spatially, that is, three-dimensionally depending on these loaded standard models. Thanks to this development, the surroundings model displayed advantageously has a more realistic effect for a viewer since, for example, the dimensions not detectable by a sensor on the vehicle and views of backsides of objects disposed relative to the vehicle, for instance, may also be represented realistically. For example, in this development, a tree as a recognized object in the area surrounding the vehicle may be represented more realistically in the surroundings model by deforming the projection surface depending on a standard model of a tree.

In accordance with an example embodiment of the present invention, at least one texture area may be represented in at least partially transparent fashion on the close-range projection surface in the surroundings model displayed. Advantageously, those texture areas are represented in at least partially transparent fashion for which the close-range projection surface—as against a flat grid plane as close-range projection surface—has been deformed spatially or three-dimensionally as a function of acquired distance data and/or loaded standard models. The texture areas with respect to deformed areas of the close-range projection surface are advantageously displayed semi-transparently. Thanks to this refinement of the present invention, a viewer is able to see through objects represented in the surroundings model or deformations of the surroundings model, and thus, for example, better evaluate a parking space in the vicinity of the vehicle, regardless of the displayed perspective of the surroundings model. In addition, in this embodiment, the advantageous effect for the user is that the representation of the surroundings model considerably expands his/her personal ability to perceive the surroundings.

In one especially preferred further continuation of the present invention, texture information concerning an unknown area of the close-range projection surface and/or of the far-range projection surface for which neither a current camera image nor a camera image stored in the electronic memory of the vehicle is available, is loaded, that is, received from a server device or from another vehicle depending on the present vehicle position. In particular, this is accomplished with the aid of a wireless link to the server device and/or the other vehicle. In other words, the texture information received includes a texture with respect to an unknown area of the nearer and/or more remote surroundings not visible up to now through a camera of the vehicle. In this further development, the display of the surroundings model also includes a projection of at least a portion of the received texture information onto the unknown areas of the generated close-range projection surface and/or the far-range projection surface. Alternatively, an estimated texture may be projected or placed on the unknown area of the generated close-range projection surface and/or the far-range projection surface, the estimated texture including an averaging or a copy of adjacent textures on the close-range projection surface and/or on the far-range projection surface, for example. Optionally, the estimated texture may also be assigned to a standard model which was loaded based on a recognized object. Thanks to this further development, the close-range projection surface and/or the far-range projection surface is/are advantageously covered completely with realistic textures in the display of the surroundings model, even if the corresponding section of the projection surface was not visible up to now utilizing a camera on the vehicle and/or is not presently visible.

In a further development of the continuation described above, during the display of the surroundings model, the received texture information or an estimated texture is projected in abstracted fashion onto the close-range projection surface and/or the far-range projection surface. This yields the advantage that it is easily discernible for the user, which area of the close-range projection surface and/or the far-range projection surface has been captured by a camera of the vehicle, and which area of the surroundings is displayed based on received texture information or estimated utilizing an estimated texture. For example, the abstraction may be accomplished by accentuating the edges and/or a change in color of the texture information and/or the estimated texture. In addition, inexactness in the display of the surroundings model, e.g., color deviations between current camera images and received texture information and/or estimated textures, are advantageously avoided in this further development without the user noticing it, since the abstraction of the received texture information and/or estimated textures beneficially supplies the user with additional information concerning the validity of the texture.

In another development in accordance with the present invention, a boundary line between received texture information and/or an estimated texture and/or a current camera image and/or a stored camera image is highlighted or, alternatively, smoothed on the close-range projection surface and/or the far-range projection surface in the display of the surroundings model. For instance, the boundary line is shown in color. The corresponding image sources are thereby particularly clearly highlighted for the user, enabling the user to thus well-assess their validity.

In a further refinement of the present invention, danger information is received from a server device and/or from another vehicle depending on the present vehicle position, in particular, the danger information being assigned danger position information. In this refinement, the display of the surroundings model additionally includes the received danger information, the received danger information being represented, especially depending on the assigned danger position information, as texture and/or as symbol on the close-range projection surface and/or the far-range projection surface. Thanks to this refinement, the attention of a user is advantageously drawn to a danger in the area surrounding the vehicle, even if it lies behind objects. For instance, the danger information includes roadway areas near schools and/or nursery schools and/or playgrounds and/or children at play, or intersections with a high risk of accident. In this way, the user is advantageously made aware of possible dangers in the surroundings, that is, is sensitized for such dangers. Thus, the danger of an accident is beneficially reduced for the user.

In accordance with an example embodiment of the present invention, it may be provided that with respect to received danger information, the textures in a danger area of the surroundings model are identified in terms of color depending on the danger position information assigned to the received danger information. In particular, the danger area is colored at a predetermined distance from the assigned danger position information and/or depending on the danger information. For instance, a building site is colored differently than an area of the surroundings model with respect to danger information involving children at play. Thanks to this refinement, the user is able to easily differentiate or recognize the danger area.

In addition, preferably an input by a user is detected to activate the method. In particular, the input may be detected through activation of a parking assistant with the aid of a pushbutton. Particularly preferred, the input represents a target position, that is, a destination with respect to a desired navigation route or trip of the user. In other words, the method is advantageously started automatically upon reaching a destination area of the trip.

The present invention also relates to a computer program, the computer program being furnished to carry out the display method according to the present invention.

The present invention also relates to an electronic control unit, the electronic control unit being equipped to carry out the display method according to the present invention.

The present invention also relates to a vehicle, the vehicle containing the electronic control unit according to the present invention.

Further advantages of the present invention are derived from the following description of exemplary embodiments with reference to the figures.

DETAILED DESCRIPTION OF EXAMPLE EMBODIMENTS

Figure 1:
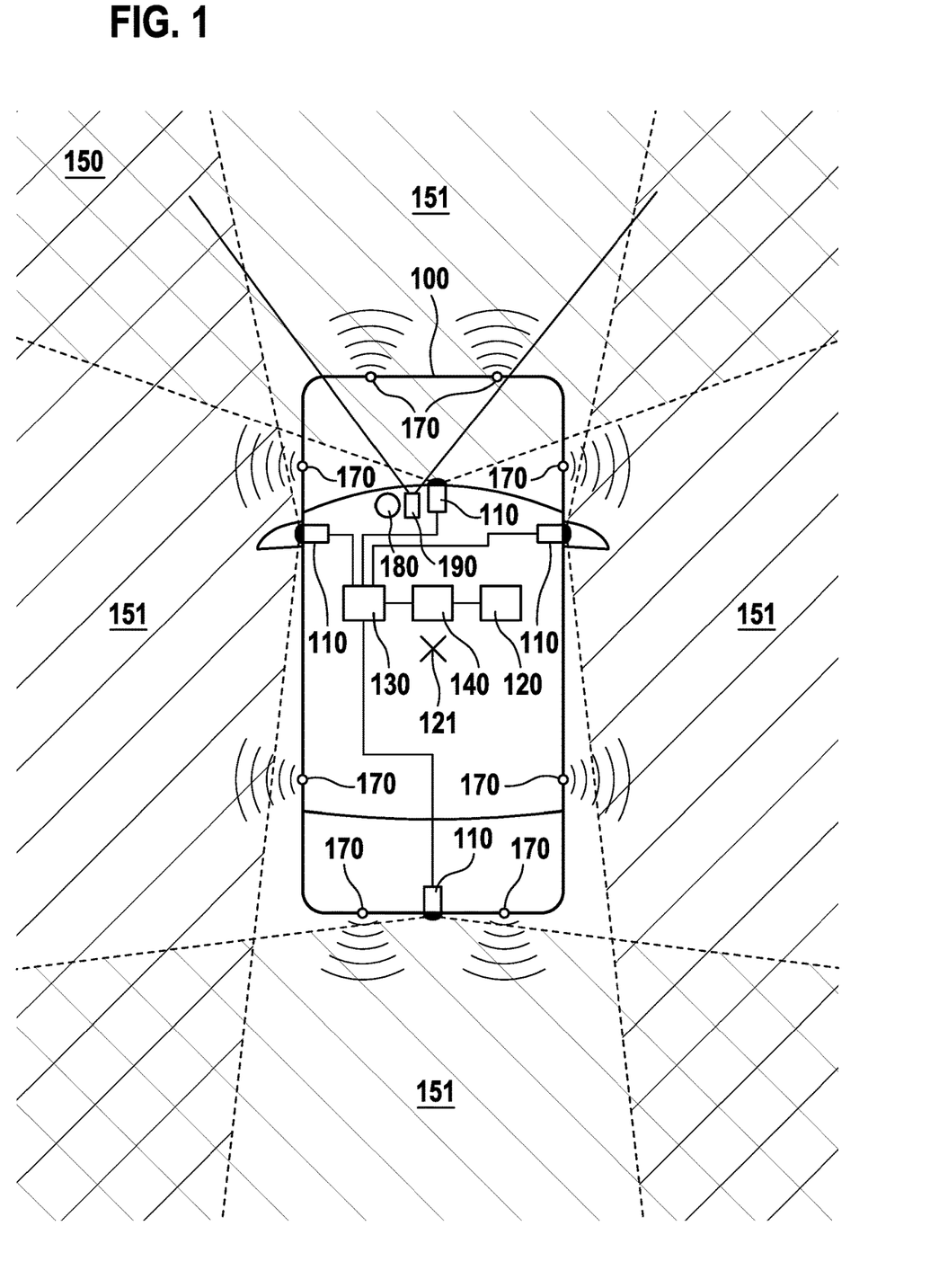
FIG. 1 shows a vehicle in accordance with an example embodiment of the present invention.

A vehicle 100 having four cameras 110 is schematically represented vertically from above, that is, from a top view or birds-eye perspective, in FIG. 1. Each of the four cameras 110 has a wide-angle optical system. Each camera 110 captures a sequence of camera images of one specific coverage area or surroundings region 151 of surroundings 150 of vehicle 100. Vehicle 100 also contains a position sensor 120 which is furnished to ascertain a present position 121 of the vehicle. Position sensor 120 is preferably a sensor for at least one global navigation satellite system such as GPS, Galileo, Glonass and/or Beidou, for example. Vehicle 100 also contains an electronic memory 130 which is equipped to store a captured camera image 230, stored camera image 230 in each case being assigned position 121, 122, 123 or 124 of vehicle 100 at the capture moment and preferably also a viewing angle of specific camera 110 which has captured the stored camera image. In addition, vehicle 100 contains an electronic control unit 140 which is equipped to carry out the display method according to the present invention. Furthermore, ultrasonic sensors 170, a lidar sensor 180 as well as a stereo camera 190 are mounted as distance sensors on the vehicle. Ultrasonic sensors 170 are located in the front, in the back and on the right and left side of the vehicle. In this exemplary embodiment, a lidar sensor 180 and a stereo camera 190 for detecting distances under different weather conditions have a coverage area in the direction of travel of vehicle 100, that is, forwards.

Figure 2:
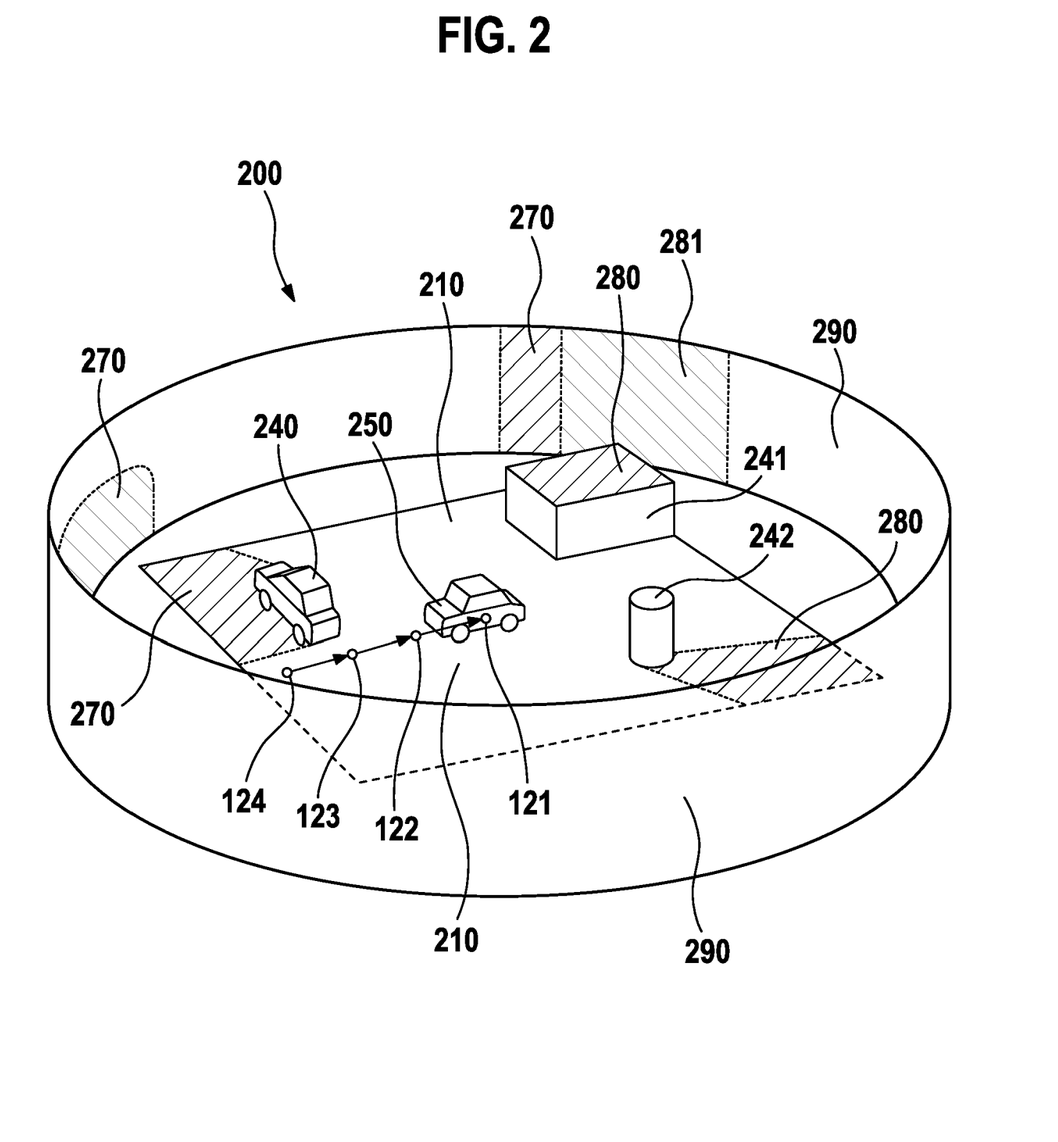
FIG. 2 shows a schematic representation of the surroundings model, in accordance with an example embodiment of the present invention.

FIG. 2 shows schematically a surroundings model 200 for displaying surroundings 150 of vehicle 100. Surroundings model 200 includes a close-range projection surface 210 as well as a vehicle model 250 which is centrally located on close-range projection surface 210. Vehicle model 250 is loaded advantageously from electronic memory 130 and corresponds to at least one type of vehicle 100. Close-range projection surface 210 represents a close range of surroundings 150 of vehicle 100 and preferably includes a grid that is fine-meshed, especially relative to the size of vehicle model 250. The surroundings model also includes a far-range projection surface 290. Far-range projection surface 290 in this exemplary embodiment is disposed essentially perpendicular to close-range projection surface 210. As an alternative to the exemplary embodiment shown in FIG. 2, close-range projection surface 210 and far-range projection surface 290 may also include different sections of a tub-shape surface, so that close-range projection surface 210 and far-range projection surface 290 are situated directly next to each other, for example, and may to some extent have a curvature. Far-range projection surface 290 represents a far range of surroundings 150 of vehicle 100. In this exemplary embodiment, far-range projection surface 290 is in one piece and is formed as the inner surface of a cylindrical lateral surface. Alternatively, far-range projection surface 290 may also be implemented as part of a lateral surface, e.g., as a half shell, and disposed in the direction of travel, or multiple far-range projection surfaces 290 may be provided, positioned rectangularly around close-range projection surface 210, for example. In other words, textures or camera images 220, 230, which image or represent the close range of surroundings 150 of vehicle 100, are displayed on close-range projection surface 210 in the surroundings model. On far-range projection surface 290, on the other hand, textures or camera images 220, 230 are displayed which image or represent the far range, that is, a more remote surroundings area of surroundings 150. Close-range projection surface 210 is deformed spatially, that is, three-dimensionally depending on detected distances from objects 240, 241 and 242 and/or depending on loaded standard models for recognized objects 240, 241 and/or 242. Thus, close-range projection surface 210 advantageously forms an envelope curve around objects 240, 241 and 242 and a background of surroundings 150 in the close range of vehicle 100. For example, vehicle 100 is in motion in this exemplary embodiment. In other words, the surroundings model changes continuously, since, for example, the textures on close-range projection surface 210 and far-range projection surface 290 shift according to the present vehicle position or, e.g., new objects appear in close-range projection surface 210 or recognized objects 240, 241 and/or 242 exit from close-range projection surface 210. For instance, in a predetermined period of time prior to the present moment, the vehicle has moved from a first vehicle position 124 via a second-last vehicle position 123 and via a last vehicle position 122 to a present vehicle position 121. During this travel from first vehicle position 124 to present vehicle position 121, a sequence of camera images 220 was captured continuously by each of cameras 110 on the vehicle and individual camera images 230 were stored, in doing so, each stored camera image 230 was assigned the specific vehicle position 124, 123, 122 or 121 of vehicle 100 at the moment respective camera image 230 was captured. The frequency with which the camera images are stored, that is, the number of camera images 230 stored and/or the predetermined period of time for storing camera images 230 may in each case be determined or set depending on the vehicle speed and/or the vehicle position. Preferably, the period of time for storing camera images 230 as well as the frequency of the storing of camera image 230 are each set in such a way that for all surroundings areas visible with the aid of cameras 110 during the movement of vehicle 100, textures are able to be projected onto close-range projection surface 210 and/or onto far-range projection surface 290 of surroundings model 200. Put another way, for old visual ranges 270 no longer visible at present vehicle position 121, camera images 230 are filed or stored in electronic memory 130, so that the surroundings model may be displayed more realistically than if only current camera images 220 were used as textures. Surroundings model 200 is thus displayed depending on current camera images 220 and stored camera images 230, so that a realistic texture is displayed in the surroundings model even for areas of the surroundings not visible with the aid of camera 110 from the present vehicle position, that is to say, for the old visual ranges 270 in surroundings model 200. The user is given the impression that the display of surroundings model 200 considerably expands his/her possible perception. In addition, unknown areas 280, 281 may be present on close-range projection surface 210 and/or on far-range projection surface 290 which were not visible by way of a camera 110 of vehicle 100 during travel of vehicle 100 and are not visible presently either, for example, because these unknown areas 280, 281 are hidden by larger objects 240, 241, 242. The texture information for these unknown areas 280 281 is received preferably from a server device and/or from another vehicle. Alternatively or additionally, the texture for respective unknown area 280, 281 is estimated. The texture for unknown area 280, 281 may be estimated depending on recognized object 240, 241 or 242 in this area 280, 281 and/or by copy of textures projected adjacently in the surroundings model. For instance, texture information concerning unknown areas 280 is received from a server device and projected onto areas 280. A fuzzy copy or a copy, represented in abstracted fashion, of the textures adjacent to unknown area 281 in surroundings model 200 may be displayed or projected onto an area 281—unknown or not visible—of far-range projection surface 290.

Figure 3:
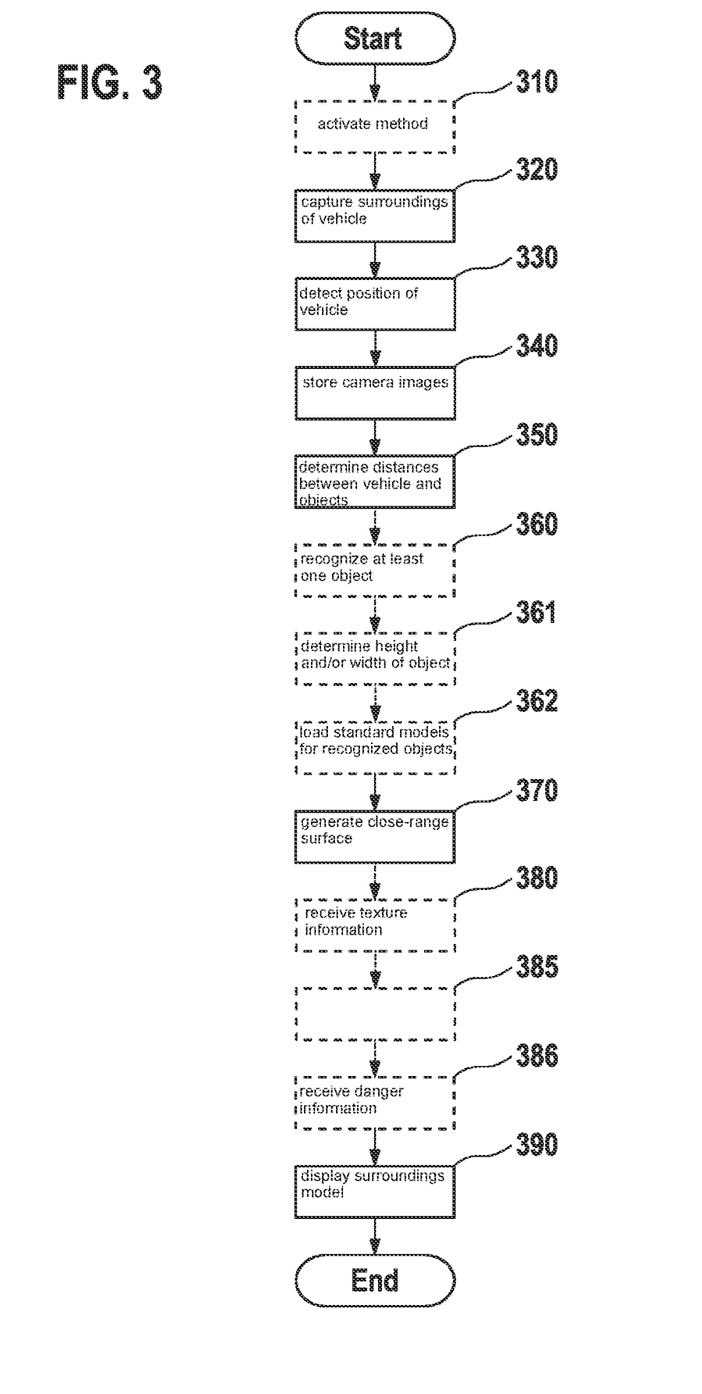
FIG. 3 shows a flowchart of the method as a block diagram, in accordance with an example embodiment of the present invention.

FIG. 3 shows a flowchart of the display method as a block diagram. In an optional first step 310, an input by the user is detected to activate the method. The input in step 310 may be accomplished by activating a parking assistant utilizing a pushbutton, for example. Alternatively, a target position, that is, a destination is input by the user, activation 310 being carried out automatically upon arrival in an area around the destination. In step 320 of the method, surroundings 150 of vehicle 100 are captured with the aid of at least one camera 110. In a further step 330, position 121 of vehicle 100 is detected. In step 340, at least one camera image 230 of surroundings 150 of the vehicle is then stored in an electronic memory 130, in doing so, each stored camera image 230 being assigned detected vehicle position 121 at the moment camera image 230 was captured. In addition, preferably the viewing angle of specific camera 110 at the capture moment is assigned to each stored camera image. Storing 340 of camera images 230 is also carried out advantageously as a function of a predetermined period of time, as a function of a predetermined time interval and/or as a function of a predetermined distance between positions of the vehicle. In a further step 350 of the method, distances between vehicle 100 and objects 240, 241, 242 in surroundings 150 of vehicle 100 are determined, the distances preferably being determined three-dimensionally. In an optional step 360, at least one object 240, 241, 242 in surroundings 150 of vehicle 100 is recognized depending on captured and/or stored camera image 220, 230. In a further optional step 361, a height and/or a width of recognized object 240, 241, 242 may be determined. In another optional step 362, standard models for recognized objects 240, 241, 242 may be loaded from an electronic memory. In method step 370, at least one close-range projection surface 210 is then generated. Close-range projection surface 210 represents the close range of surroundings 150 around vehicle 100. In step 370, close-range projection surface 210 is generated so that it is deformed three-dimensionally depending on the determined distances. Optionally, in step 370, close-range projection surface 210 may additionally be spatially, that is, three-dimensionally deformed depending on the ascertained height and/or the ascertained width of recognized objects 240, 241, 242 and/or depending on the loaded standard models for recognized objects 240, 241, 242. Furthermore, in step 370, close-range projection surface 210 may additionally be deformed three-dimensionally depending on an ascertained object mobility. In an optional step 380, texture information with regard to at least one unknown area 280 of close-range projection surface 210 and/or of far-range projection surface 290, for which neither a current camera image 220 nor a camera image 230 stored in electronic memory 130 of vehicle 100 is available, may be received. In particular, the texture information is received from a server device and/or from another vehicle depending on present vehicle position 121 and advantageously after sending off a request for the texture information depending on present vehicle position 121 or the location or position of unknown area 280. In an optional step 386, danger information may be received from a server device and/or from another vehicle depending on the present vehicle position, in particular, position information being assigned to the danger information. In step 390, surroundings model 200 is displayed or represented as a function of generated close-range projection surface 210, at least one current camera image 220, a stored camera image 230 and present vehicle position 121. As an option, displaying 390 surroundings model 200 additionally includes a projection of at least a portion of the received texture information onto unknown area 280 of close-range projection surface 210 and/or of far-range projection surface 290. Optionally, in method step 390, the received texture information or an estimated texture is projected in abstracted fashion onto close-range projection surface 210 and or far-range projection surface 290 in the surroundings model. Moreover, in displaying 390 surroundings model 200, optionally a boundary line between received texture information or an estimated texture and a current camera image 220 or a stored camera image 230 may be highlighted on close-range projection surface 210 and/or on far-range projection surface 290. As an option, displaying 390 surroundings model 200 may additionally include the received danger information, the received danger information being shown on the close-range projection surface and/or the far-range projection surface depending particularly on the assigned position information. In displaying 390 surroundings model 200 with respect to received danger information, the textures in a danger area of surroundings model 200 may be identified in terms of color depending on the position information assigned to the received danger information. For example, the danger area may be colored at a predetermined distance from the position information of the danger information and/or depending on the danger information. In addition, it may be provided in step 390 that a section of the close-range projection surface representing a reflective surroundings area is recognized by a trained neural network, that is, by an automated trained recognition method. For example, the reflective surroundings area is a windowpane or an exterior mirror of another vehicle in the vicinity of the vehicle or a mirror or glass facade of a building nearby the vehicle. As an option, displaying 390 surroundings model 200 may include at least a projection of at least a part of a current camera image 220, a part of a stored camera image 230, a portion of the received texture information or a portion of the estimated texture onto this recognized section, which represents the recognized reflective surroundings area.

What is claimed is:

1. A method for displaying a surroundings model of a vehicle, comprising the following steps:
    capturing at least one sequence of camera images of at least one section of surroundings of the vehicle using at least one camera which is mounted on the vehicle;
    detecting a position of the vehicle;
    storing at least some of the camera images of the surroundings of the vehicle in an electronic memory, each stored camera image being assigned the detected position of the vehicle at the moment the stored camera image was captured;
    determining distances between the vehicle and objects in the surroundings of the vehicle;
    generating at least one close-range projection surface which represents a close range of the surroundings around the vehicle, the close-range projection surface being deformed three-dimensionally depending on the determined distances; and
    displaying the surroundings model as a function of the generated close-range projection surface, at least one current camera image, a stored camera image, and a present vehicle position,
    wherein each of the stored camera images is assigned a viewing angle of a specific camera at a capture moment, and in displaying the surroundings model, the current camera image as a function of the present vehicle position and the stored camera image as a function of the present vehicle position and the assigned position of the vehicle are additionally projected as texture onto the generated close-range projection surface and/or a far-range projection surface depending on the assigned viewing angle,
    wherein texture areas of the surroundings model which are based on stored camera images are displayed differently than those based on current camera images, the stored image texture areas being color-falsified or displayed in shades of gray.

2. The method as recited in claim 1, wherein the camera images are stored as a function of a predetermined period of time, as a function of a predetermined time interval and/or as a function of a predetermined distance between positions of the vehicle.

3. The method as recited in claim 1, wherein prior to the displaying of the surroundings model, the following steps are carried out:
   recognizing at least one object in the surroundings of the vehicle depending on at least one of the captured camera images;
   determining a height and/or a width of the recognized; and
   generating the close-range projection surface depending additionally on the determined height and/or the determined width of the recognized object.

4. The method as recited in claim 1, wherein prior to the displaying of the surroundings model, the following steps are carried out:
   recognizing at least one object in the surroundings of the vehicle depending on at least one of the captured camera images;
   loading a standard model for the recognized object; and
   generating the close-range projection surface depending additionally on the loaded standard model for the recognized object.

5. The method as recited in claim 4, wherein at least one texture area is represented in at least partially transparent fashion on the close-range projection surface in the surroundings model.

6. The method as recited in claim 1, further comprising:
   receiving texture information with respect to at least one unknown area of the close-range projection surface and/or of a far-range projection surface for which neither a current camera image nor a camera image stored in the electronic memory of the vehicle is available, the texture information being received from a server device and/or from another vehicle depending on the present vehicle position; and
   displaying the surroundings model, the surroundings model additionally including a projection of at least a portion of the received texture information onto the unknown area of the close-range projection surface and/or of the far-range projection surface.

7. The method as recited in claim 1, further comprising:
   receiving danger information from a server device and/or from another vehicle depending on the present vehicle position, position information being assigned to the danger information; and
   displaying the surroundings model, the surroundings model additionally including the received danger information, the received danger information being represented on the close-range projection surface and/or a far-range projection surface depending on the assigned position information.

8. The method as recited in claim 7, wherein, in the displaying of the surroundings model with respect to received danger information, textures in a danger area of the surroundings model are identified in terms of color depending on the position information assigned to the received danger information, the danger area is colored at a predetermined distance from the assigned position information and/or depending on the danger information.

9. The method as recited in claim 1, wherein prior to the displaying of the surroundings model, the following step is carried out:
   detecting an input by a user for activating the method, the input representing a target position with respect to a desired trip of the user.

10. A method for displaying a surroundings model of a vehicle, comprising the following steps:
    capturing at least one sequence of camera images of at least one section of surroundings of the vehicle using at least one camera which is mounted on the vehicle;
    detecting a position of the vehicle;
    storing at least some of the camera images of the surroundings of the vehicle in an electronic memory, each stored camera image being assigned the detected position of the vehicle at the moment the stored camera image was captured;
    determining distances between the vehicle and objects in the surroundings of the vehicle;
    generating at least one close-range projection surface which represents a close range of the surroundings around the vehicle, the close-range projection surface being deformed three-dimensionally depending on the determined distances;
    displaying the surroundings model as a function of the generated close-range projection surface, at least one current camera image, a stored camera image, and a present vehicle position;
    receiving texture information with respect to at least one unknown area of the close-range projection surface and/or of a far-range projection surface for which neither a current camera image nor a camera image stored in the electronic memory of the vehicle is available, the texture information being received from a server device and/or from another vehicle depending on the present vehicle position; and
    displaying the surroundings model, the surroundings model additionally including a projection of at least a portion of the received texture information onto the unknown area of the close-range projection surface and/or of the far-range projection surface,
    wherein in the displaying of the surroundings model, the received texture information or an estimated texture is projected in abstracted fashion onto the close-range projection surface and/or a far-range projection surface.

11. A method for displaying a surroundings model of a vehicle, comprising the following steps:
    capturing at least one sequence of camera images of at least one section of surroundings of the vehicle using at least one camera which is mounted on the vehicle;
    detecting a position of the vehicle;
    storing at least some of the camera images of the surroundings of the vehicle in an electronic memory, each stored camera image being assigned the detected position of the vehicle at the moment the stored camera image was captured;
    determining distances between the vehicle and objects in the surroundings of the vehicle;
    generating at least one close-range projection surface which represents a close range of the surroundings around the vehicle, the close-range projection surface being deformed three-dimensionally depending on the determined distances;
    displaying the surroundings model as a function of the generated close-range projection surface, at least one current camera image, a stored camera image, and a present vehicle position;

receiving texture information with respect to at least one unknown area of the close-range projection surface and/or of a far-range projection surface for which neither a current camera image nor a camera image stored in the electronic memory of the vehicle is available, the texture information being received from a server device and/or from another vehicle depending on the present vehicle position; and displaying the surroundings model, the surroundings model additionally including a projection of at least a portion of the received texture information onto the unknown area of the close-range projection surface and/or of the far-range projection surface,     wherein in the displaying of the surroundings model, a boundary line between received texture information and/or an estimated texture and/or a current camera image and/or a stored camera image is highlighted on the close-range projection surface and/or a far-range projection surface.

12. A non-transitory computer-readable medium on which is stored a computer program for displaying a surroundings model of a vehicle, the computer program, when executed by a computer, causing the computer to perform the following steps:

capturing at least one sequence of camera images of at least one section of surroundings of the vehicle using at least one camera which is mounted on the vehicle;

detecting a position of the vehicle;

storing at least some of the camera images of the surroundings of the vehicle in an electronic memory, each stored camera image being assigned the detected position of the vehicle at the moment the stored camera image was captured;

determining distances between the vehicle and objects in the surroundings of the vehicle;

generating at least one close-range projection surface which represents a close range of the surroundings around the vehicle, the close-range projection surface being deformed three-dimensionally depending on the determined distances; and     displaying the surroundings model as a function of the generated close-range projection surface, at least one current camera image, a stored camera image, and a present vehicle position,     wherein each of the stored camera images is assigned a position of the vehicle and a viewing angle of a specific camera at a capture moment, and in displaying the surroundings model, the current camera image as a function of the present vehicle position and the stored camera image as a function of the present vehicle position and the assigned position of the vehicle are additionally projected as texture onto the generated close-range projection surface and/or a far-range projection surface depending on the assigned viewing angle,     wherein texture areas of the surroundings model which are based on stored camera images are displayed differently than those based on current camera images, the stored image texture areas being color-falsified or displayed in shades of gray.

13. An electronic control unit configured to display a surroundings model of a vehicle, the electronic control unit configured to:

capture at least one sequence of camera images of at least one section of surroundings of the vehicle using at least one camera which is mounted on the vehicle;

detect a position of the vehicle;

store at least some of the camera images of the surroundings of the vehicle in an electronic memory, each stored camera image being assigned the detected position of the vehicle at the moment the stored camera image was captured;

determine distances between the vehicle and objects in the surroundings of the vehicle;

generate at least one close-range projection surface which represents a close range of the surroundings around the vehicle, the close-range projection surface being deformed three-dimensionally depending on the determined distances; and     display the surroundings model as a function of the generated close-range projection surface, at least one current camera image, a stored camera image, and a present vehicle position,     wherein each of the stored camera images is assigned a position of the vehicle and a viewing angle of a specific camera at a capture moment, and in displaying the surroundings model, the current camera image as a function of the present vehicle position and the stored camera image as a function of the present vehicle position and the assigned position of the vehicle are additionally projected as texture onto the generated close-range projection surface and/or a far-range projection surface depending on the assigned viewing angle,     wherein texture areas of the surroundings model which are based on stored camera images are displayed differently than those based on current camera images, the stored image texture areas being color-falsified or displayed in shades of gray.

14. A vehicle, comprising:

an electronic control unit configured to display a surroundings model of the vehicle, the electronic control unit configured to:

capture at least one sequence of camera images of at least one section of surroundings of the vehicle using at least one camera which is mounted on the vehicle;

detect a position of the vehicle;

store at least some of the camera images of the surroundings of the vehicle in an electronic memory, each stored camera image being assigned the detected position of the vehicle at the moment the stored camera image was captured;

determine distances between the vehicle and objects in the surroundings of the vehicle;

generate at least one close-range projection surface which represents a close range of the surroundings around the vehicle, the close-range projection surface being deformed three-dimensionally depending on the determined distances; and     display the surroundings model as a function of the generated close-range projection surface, at least one current camera image, a stored camera image, and a present vehicle position,     wherein each of the stored camera images is assigned a position of the vehicle and a viewing angle of a specific camera at a capture moment, and in displaying the surroundings model, the current camera image as a function of the present vehicle position and the stored camera image as a function of the present vehicle position and the assigned position of the vehicle are additionally projected as texture onto the generated close-range projection surface and/or a far-range projection surface depending on the assigned viewing angle, wherein texture areas of the surroundings model which are based on stored camera images are displayed differently than those based on current camera images, the stored image texture areas being color-falsified or displayed in shades of gray.

\* \* \* \* \*